(12) United States Patent
Antony et al.

(10) Patent No.: US 10,521,279 B2
(45) Date of Patent: Dec. 31, 2019

(54) SYSTEM AND METHOD FOR DYNAMIC LOG LEVEL CONTROL

(71) Applicant: VMWARE, INC., Palo Alto, CA (US)

(72) Inventors: Jinto Antony, Bangalore (IN); Hariharan Jeyaraman Ganesan, Bangalore (IN); Madhusudhanan Gangadharan, Bangalore (IN); Kalyan Venu Gopal Abbaraju, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/610,650

(22) Filed: Jun. 1, 2017

(65) Prior Publication Data
US 2018/0349213 A1 Dec. 6, 2018

(51) Int. Cl.
*G06F 9/54* (2006.01)
*G06F 16/2455* (2019.01)
*G06F 11/34* (2006.01)
*G06F 11/07* (2006.01)

(52) U.S. Cl.
CPC .......... *G06F 9/542* (2013.01); *G06F 11/0766* (2013.01); *G06F 11/3476* (2013.01); *G06F 16/24568* (2019.01)

(58) Field of Classification Search
CPC ....................................................... G06F 9/542
USPC ........................................................ 719/318
See application file for complete search history.

(56) References Cited

U.S. PATENT DOCUMENTS

| | | | |
|---|---|---|---|
| 2007/0283194 A1* | 12/2007 | Villella | G06F 11/3476 714/57 |
| 2016/0105325 A1* | 4/2016 | Fletcher | H04L 41/12 715/737 |
| 2017/0220406 A1* | 8/2017 | Parnell | G06F 11/0778 |

* cited by examiner

*Primary Examiner* — Timothy A Mudrick

(57) ABSTRACT

The present disclosure is related to dynamically control log level in a datacenter. An example machine-readable medium may store instructions executable by a processing resource to receive a stream of log data from a plurality of end devices via associated logging interfaces in the virtual datacenter. Further, the received stream of log data is dynamically analyzed. Furthermore, the log level of any one or more of the plurality of end devices is then controlled based on the analysis. The log data associated with the controlled log level of any one of the one or more of plurality of end devices is then received, which can then assist in debugging and troubleshooting.

21 Claims, 6 Drawing Sheets

SYSTEM AND METHOD FOR DYNAMIC LOG LEVEL CONTROL

BACKGROUND

Virtual computing instances (VCIs), such as virtual machines (VMs), virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

However, largescale visualized infrastructure may have many (e.g., thousands) of VMs running on many physical machines. High availability requirements provide system administrators with little time to diagnose or bring down parts of infrastructure for maintenance. Fault-tolerant features ensure the virtualized computing infrastructure continues to operate when problems arise, by may generate many intermediate states that have to be reconciled and addressed. As such identifying, debugging, and resolving failures and performance issues for virtualized computing environments can be challenging.

Many software and hardware components generate log messages (log data) via interfaces (e.g., front end applications, storage applications, networking applications and the like) to facilitate technical support and trouble shooting. All these interfaces may be interlinked to each other in more complex way either via peer to peer or via client/server way, by hundreds of sync and async processes, services, daemons interacting with each other rather in serial, forked and/or parallel ways. However, over an entire virtualized computing infrastructure, massive amounts of unstructured log data (giga-bytes of unstructured log data per day) may be generated continuously by every endpoint (e.g., end device, end component and so on) of the virtualized computing infrastructure. As such, storing, finding information, searching, analyzing within the log data that identifies the problems of virtualized computing infrastructure, can be difficult, due to the overwhelming volume of unstructured log data to be analyzed.

DETAILED DESCRIPTION

Figure 1:
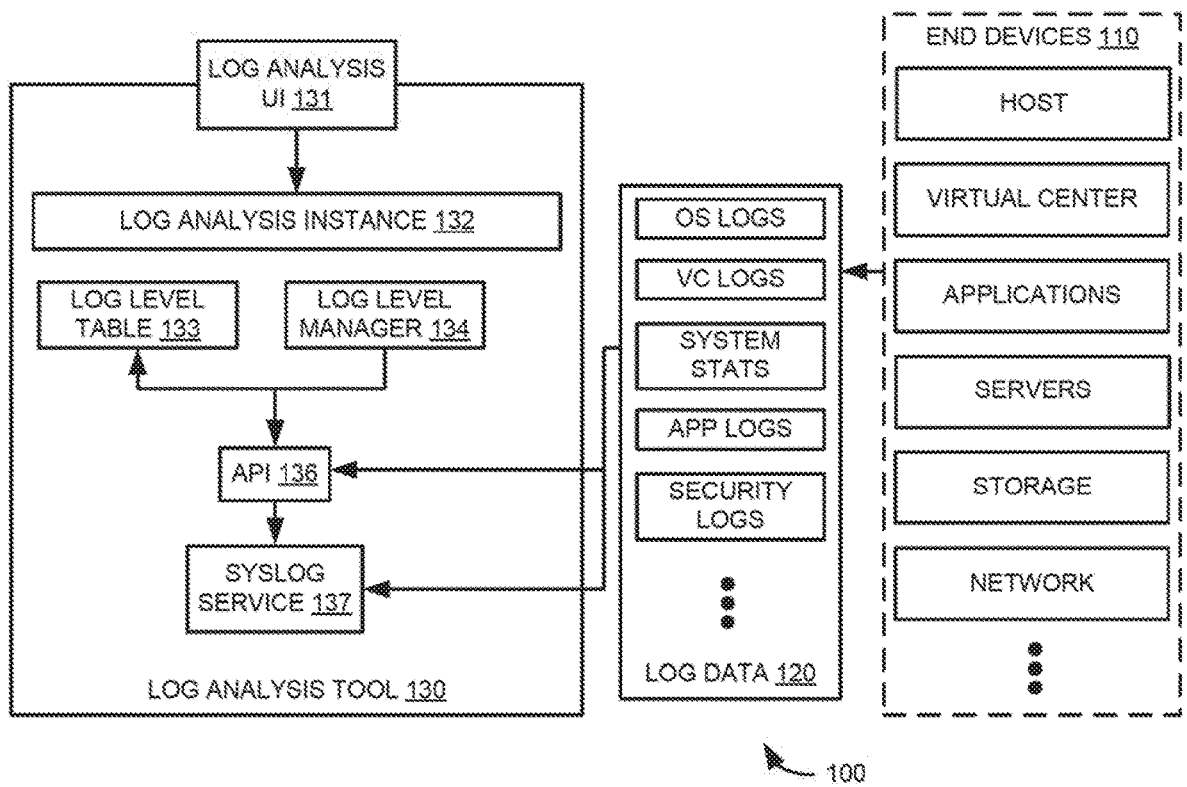
FIG. 1 is an example block diagram illustrating receiving of log data from end devices by a log analysis tool of a virtualized computing infrastructure for dynamic log level control, according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VIM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

The term "end device" refers to a storage device, computing device, virtual machine, network device, and/or software application. Also, the term "log level" refers to level of log data.

The present disclosure is not limited to particular devices or methods, which may vary. The terminology used herein is for describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or or eliminated to provide several additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to monitor the log data received from end devices and to dynamically control the level, of log data received from any one or more of the end devices to facilitate debugging and troubleshooting, for example, in the context of a software defined data center (e.g., a distributed computing environment) including one or more VCIs and/or hosts. In some embodiments, an example machine-readable medium may store instructions executable by a processing resource to dynamically control log level.

FIG. 1 is a diagram of a system 100 for receiving log data from end devices for dynamic log level control. Example system is a virtualized computing infrastructure of a datacenter. As shown in FIG. 1, the system 100 incudes plurality of end devices 110, log data 120, and a log analysis tool 130. Further as shown in FIG. 1, the log analysis tool 130 includes a log analysis user interface (UI) 131, log analysis instance 132, log level table 133, log level manager 134, application protocol interface (API) 136 and SYSLOG service 137.

Figure 2:
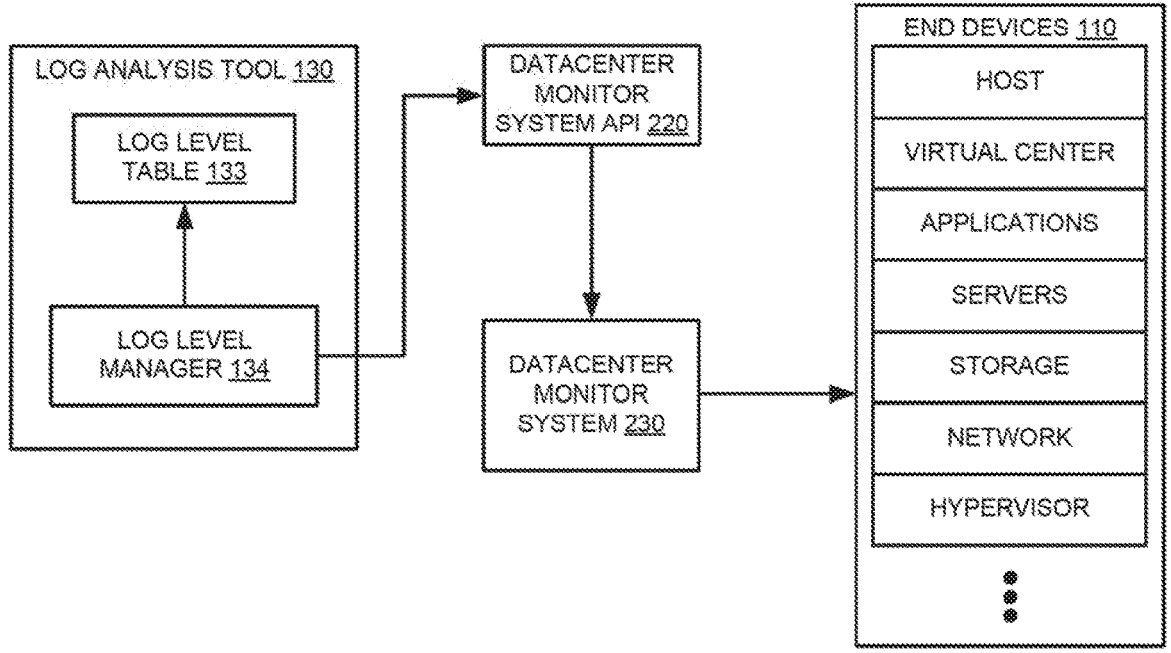
FIG. 2 is another example block diagram illustrating dynamic log level control in a virtualized computing infrastructure via a log management/monitoring system, according to the present disclosure.
Figure 3:
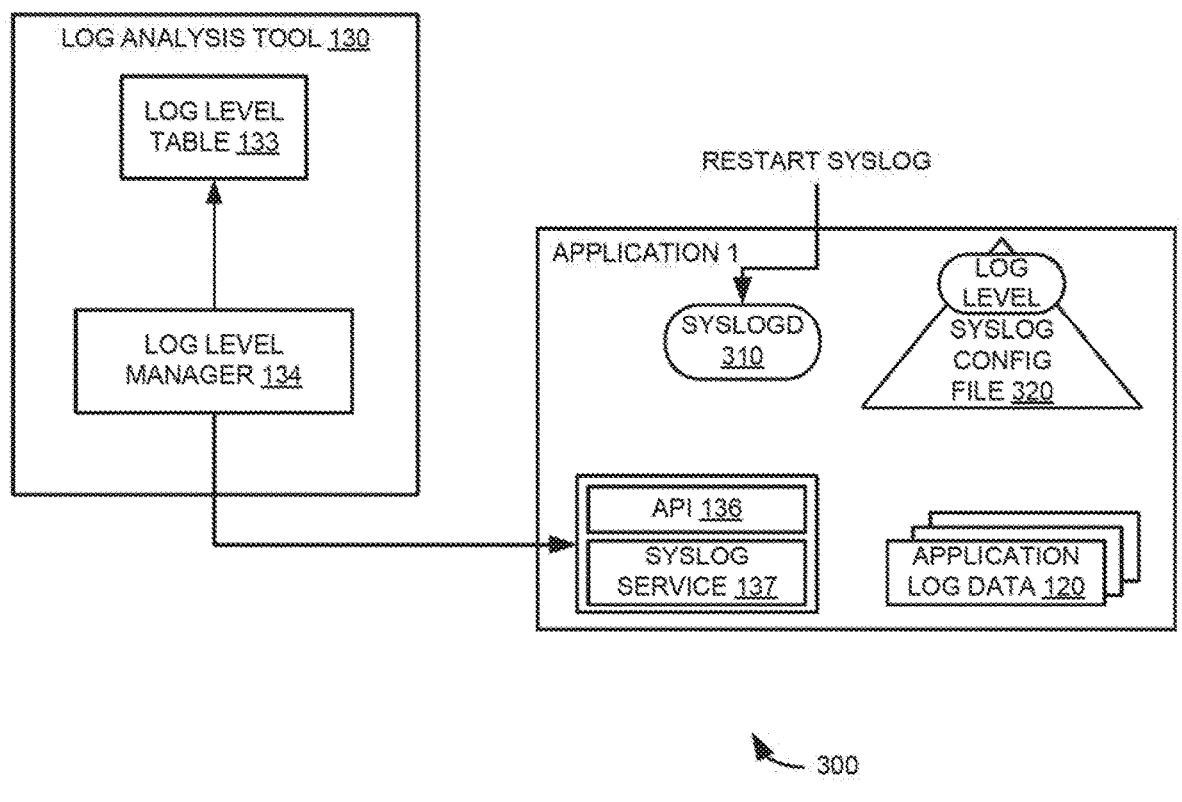
FIG. 3 is yet another example block diagram illustrating dynamic log level control in a virtualized computing infrastructure via interfaces, such as application protocol interface (API) and system logic (SYSLOG) service, according to the present disclosure.

FIG. 2 is a diagram of a log management/monitoring system 200 for dynamic log level control in a virtualized computing infrastructure. As shown in FIG. 2, the log management/monitoring system 200 includes the plurality of end devices 110, the log analysis tool 130, a data center monitor system API 220, and a data center monitor system 230, FIG. 3 is a diagram of a system 300 for dynamic log level control of end devices 110, in a virtualized computing infrastructure, via interfaces, such as APE 136 and SYSLOG service 137. As shown in FIG. 3, the system 300 includes the log analysis tool 130 that is communicatively coupled to an application 1. Further as shown in FIG. 3, the application 1 includes a SYSLOGD 310, SYSLOG config file 320, API 136, SYSLOG service 137 and the application log data 120.

In operation, the log analysis tool 130 receives a stream of log data 120 from a plurality of end devices 110 via associated logging interfaces in a datacenter as shown in FIG. 1. Example datacenter is a virtual datacenter. Example end devices 110 may include a storage device, a computing device, a virtual machine (VM), a network device, a container, an operating, system, management server, a software application and the like. Software application may be a frontend application, storage application, networking application and so on. Example log data 120 may include operating system (OS) logs, virtual center (VC) logs, host logs, system stats, application logs, security logs, infrastructure supporting logs, and the like. Example logging interfaces may include an API 136 and a SYSLOG service 137. In some embodiments, the log analysis tool 130 may be configured to receive the stream of log data 120 at regular intervals from the plurality of end devices 110 via API 136 and/or SYSLOG service 137 and monitor and manage the received stream of log data 120. In some embodiments, the log level manger 134 maintains a log matrix to record the log level and other associated logging details at a given time for each of the plurality of end devices 110.

The log level manager 134 then dynamically analyzes the received stream of log data. In some embodiments, the log level manager 134 dynamically analyzes the quality, quantity and/or severity of the received stream of log data 120 from any one or more of the plurality of end devices. In some embodiments, the severity of the received stream of log data 120 may be based on type of error messages in the received stream of log data. The log analysis user interface (UI) 131 may be used to view the dynamically analyzed stream of log data. The log analysis instance 132. For example, log analysis instance 132 may include the period of logs that are getting analyzed and may be similar to keeping a bookmark during the period, so that further log analysis instances may not be reanalyze the already analyzed and recorded instances and can maintain the index/versions of the analyzed logs.

In some embodiments, the log level manager 134 may be designed to analyze the received stream of log data 120 based on type and set of services and other parameters like current logging level, size of the logs, for example, megabytes (MB), formatting and so on. In some embodiments, the log level manager 134 analyzes top layer logs, such as virtual machine kernel (VM kernel) or virtual provisioning X agent (VPXA) to extract the root cause of the error because, any errors in lower layers may percolate to the top layer and may not miss out issues reported in the entire stack to improve the performance.

The log level manager 134 then controls the log level of any one or more of the plurality of end devices 110 based on the analysis. In some embodiments, before controlling the log level of any one or more of the plurality of end devices 110, i.e., to start with they may be set at a predetermined basic level. The interdependency of the plurality of end devices 110 may be determined based interlinked set of services learnt via various service dependency chain mappings from the monitored end device by the log level manager 134. In these embodiments, the log level manager 134 may control the log level of all the interdependent end devices by providing required log changes to the associated end devices. In some embodiments, the log level manager 134 may either increase, decrease or tune the log level of the received log data 120 associated with the one or more of the plurality of end devices 110 based on the outcome of the determined error messages and selecting one of the predetermined log levels or log values. In some embodiments, the log level of any one or more the plurality of end devices 120 may be increased or decreased via the data center monitor system API 220 and the data center monitor system 230 (shown in FIG. 2). In other embodiments, the log level of any one or more the plurality of end devices 120 may be increased or decreased via the API 136 and/or SYSLOG service 137 as shown in FIG. 3. Table 1 below illustrates example predetermined log levels and/or log values maintained by the SYSLOGD 310 and SYSLOG CON FIG FILE 320 that may be used to control any one or more the plurality of the end devices 110:

TABLE 1

| Value | Severity | Keyword | Deprecated keywords | Description |
| --- | --- | --- | --- | --- |
| 0 | Emergency | emerg | panic | System is unusable. A panic condition. |

TABLE 1-continued

| Value | Severity | Keyword | Deprecated keywords | Description |
|---|---|---|---|---|
| 1 | Alert | alert | | Action must be taken immediately. A condition that should be corrected immediately, such as a corrupted system database. |
| 2 | Critical | crit | | Critical conditions, such as hard device errors. |
| 3 | Error | err | error | Error conditions. |
| 4 | Warning | warning | warn | Warning conditions. |
| 5 | Notice | notice | | Normal but significant conditions. Conditions that are not error conditions, but that may require special handling. |
| 6 | Informational | info | | Informational messages. |
| 7 | Debug | debug | | Debug-level messages. Messages that contain information normally of use only when debugging a program. |

Syslog config can be a configuration file repository managed and invoked by Syslog daemon (SYSLOGD) 310, wherein the configuration file can globally maintain the logging level information's of each end device. For example Syslog daemons may collect, filter, display, alert, archive, forward, and/or react to Syslog & simple network management protocol (SNMP) traps. In these embodiments, SYSLOGD 310 is the service or daemon running. SYSLOG CONFIG FILE 320 is the syslog configuration file based on which the SYSLOGD 310 service may be running. The configuration can be log level which can be changed by editing the SYSLOG CONFIG FILE 320 and restarting the service.

The log data 120 associated with the controlled log level of any one of the one or more of the plurality of end devices 110 is then received via the log analysis UI 131, which can then assist in debugging and troubleshooting the associated one or more of the plurality of end devices 110. Once the debugging and troubleshooting, is completed, the log level manager 134 may reset the log levels of the associated one or more of the plurality of end devices 110 to their initial preset or basic levels.

Figure 4:
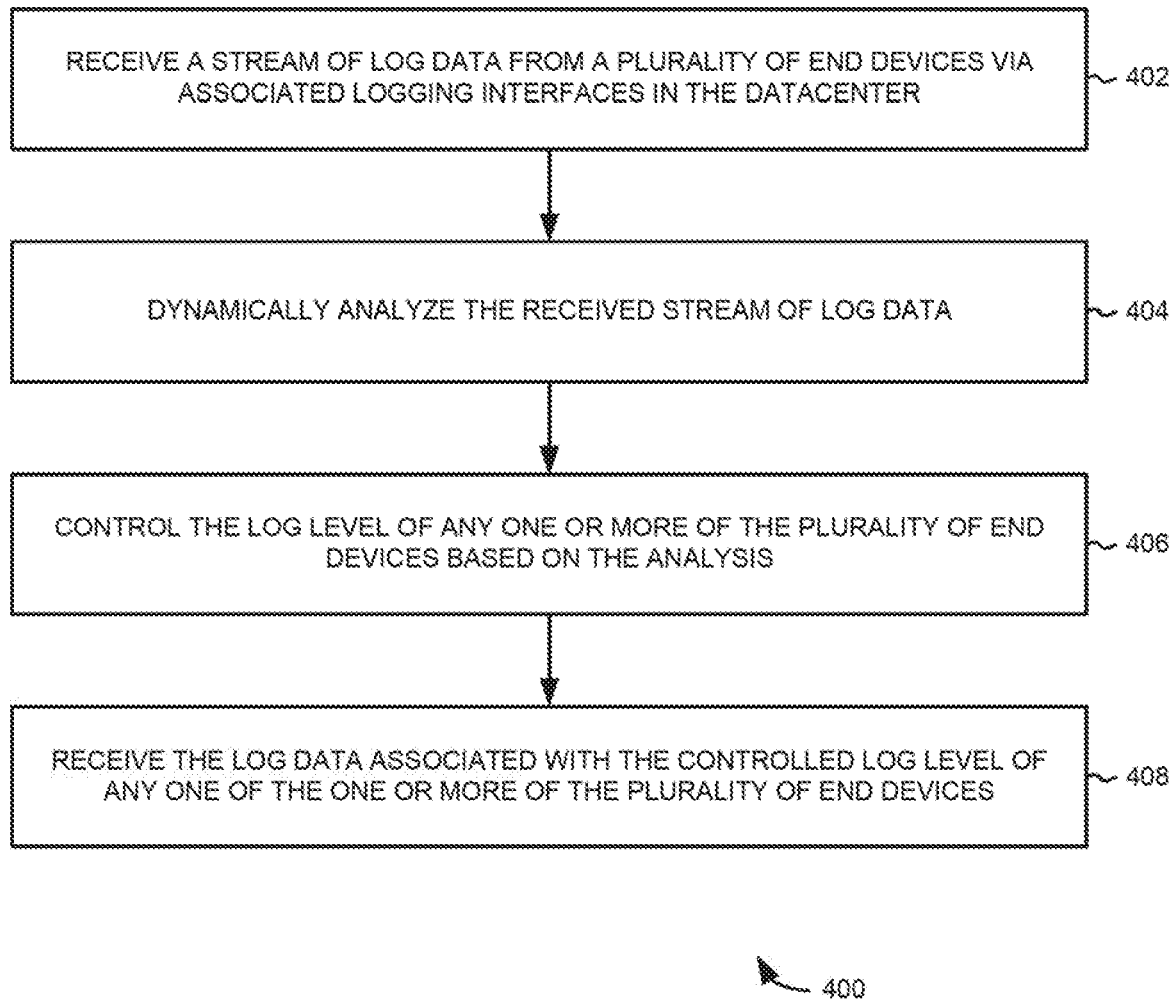
FIG. 4 is a flow diagram of a method for dynamic log level control, according to the present disclosure.

With reference now to FIG. 4, a flowchart for dynamic log level control is shown in accordance with an embodiment. In one embodiment, plurality of end devices 110 are communicatively coupled to log analysis tool 130 via logging interfaces, such as API 136 and SYSLOG service 137. In this embodiment, the log analysis tool 130 includes a log level manager 134 to receive, monitor and control log data 120 via the logging interfaces.

At 402, a stream of log data is received from a plurality of end devices via associated logging interfaces in a datacenter. Example datacenter is a virtual datacenter infrastructure. Example end devices are a storage device, a computing device, a VM, a network device, a software application and the like. Software application may be a frontend application, storage application, networking application and so on. Example log data 120 may include operating system (OS) logs, virtual center (VC) logs, host logs, system stats, application logs, security logs, infrastructure supporting logs, and the like. Example logging interfaces are an application programming interface (API) 136 and a SYSLOG service 137.

At 404, the received stream of log data is dynamically analyzed. In some embodiments, the received stream of log data is dynamically analyzed for the quality, quantity and/or severity in the received stream of log data from any one or more of the plurality of end devices. In one embodiment, severity of the received stream of log data is based on type of error messages in the received stream of log data in any one or more of the plurality of end devices.

At 406, the log level of any one or more of the plurality of end devices is controlled based on the analysis. In some embodiments, the log level of the received log data associated with the one or more of the plurality of end devices is changed based on the outcome of the determined error messages and/or exception messages. In some embodiments, changing the log level includes either increasing or decreasing the log level of the received log data associated with the one or more of the plurality of end devices based on the outcome of the determined error messages and selecting one of the predetermined log levels. The process of dynamically analyzing the received stream of log data and controlling the log level of any one or more of the end devices is shown in more details in FIGS. 5 and 6 and in steps 502 to 520 and 602 to 616, respectively.

At 408, the log data associated with the controlled log level of any one of the one or more of the plurality of end devices is received for debugging and troubleshooting associated one or more of the plurality of end devices. Such analysis and controlling of the log level of any one or more of the plurality of end devices in the datacenter may significantly reduce receiving of unwanted and irrelevant log data and further can significantly reduce the amount of time that may be needed by the developer and/or administrator to root cause and debug problems that can arise during operation. Furthermore, the above system and method provides an efficient and intelligent way to parse log data to facilitate debugging and troubleshooting of any issues that might arise during operation of the datacenter.

Figure 7:
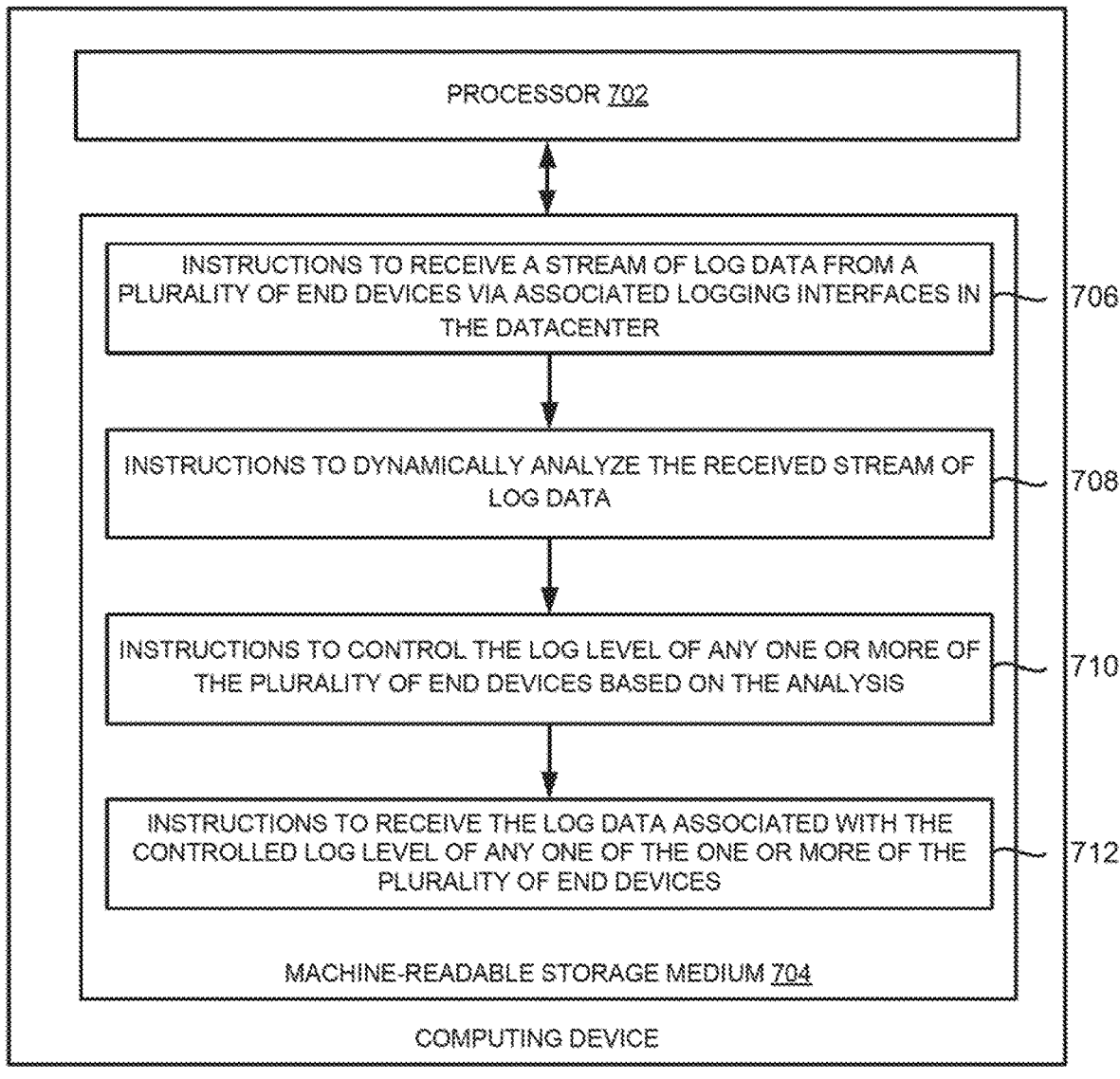
FIG. 7 is a diagram of a non-transitory machine readable medium storing, instructions for dynamic log-level control, according to the present disclosure.

FIG. 7 is a block diagram of an example system 700 including instructions in a machine-readable storage medium for dynamic log level control in a datacenter. System 700 includes a processor 702 and a machine-readable storage medium 704 communicatively coupled through a system bus. In an example, system 700 may be analogous to a plurality of end devices 110 and a log analysis tool 130 of FIGS. 1-3. Processor 702 may be any type of Central Processing Unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be Synchronous DRAM (SDRAM), Double Data Rate (DDR), Rambus DRAM (RDRAM), Rambus RAM, etc. or storage memory media such as a floppy disk, a hard disk, a CD-ROM, a MID, a pen drive, and the like. In an example, machine-readable storage medium may be a non-transitory machine-readable medium.

Machine-readable storage medium 704 may store instructions 706, 708, 710, and 712. In an example, instructions 706 may be executed by processor 702 to receive a stream of log data from a plurality of end devices via associated logging interfaces in a datacenter. Instructions 708 may be executed by processor 702 to dynamically analyze the received stream of log data. In an example, the instructions to dynamically analyze may comprise dynamically analyzing the quality, quantity and/or severity of the received stream of log data from any one or more of the plurality of end devices, instructions 710 may be executed by processor 702 to control the log level of any one or more of the plurality of end devices based on the analysis. In an example, the instructions to control log level may comprise determining whether there are any error messages associated with one or more of the plurality of end devices in the received stream of log data and then controlling the log level of any one or more plurality of end devices based on the determination. Instructions 712 may be executed by processor 702 to receive the log data associated with the controlled log level of any one of the one or more of the plurality of end devices to facilitate faster debugging and troubleshooting of any issues arising from any of the plurality of end devices in the datacenter.

Figure 5:
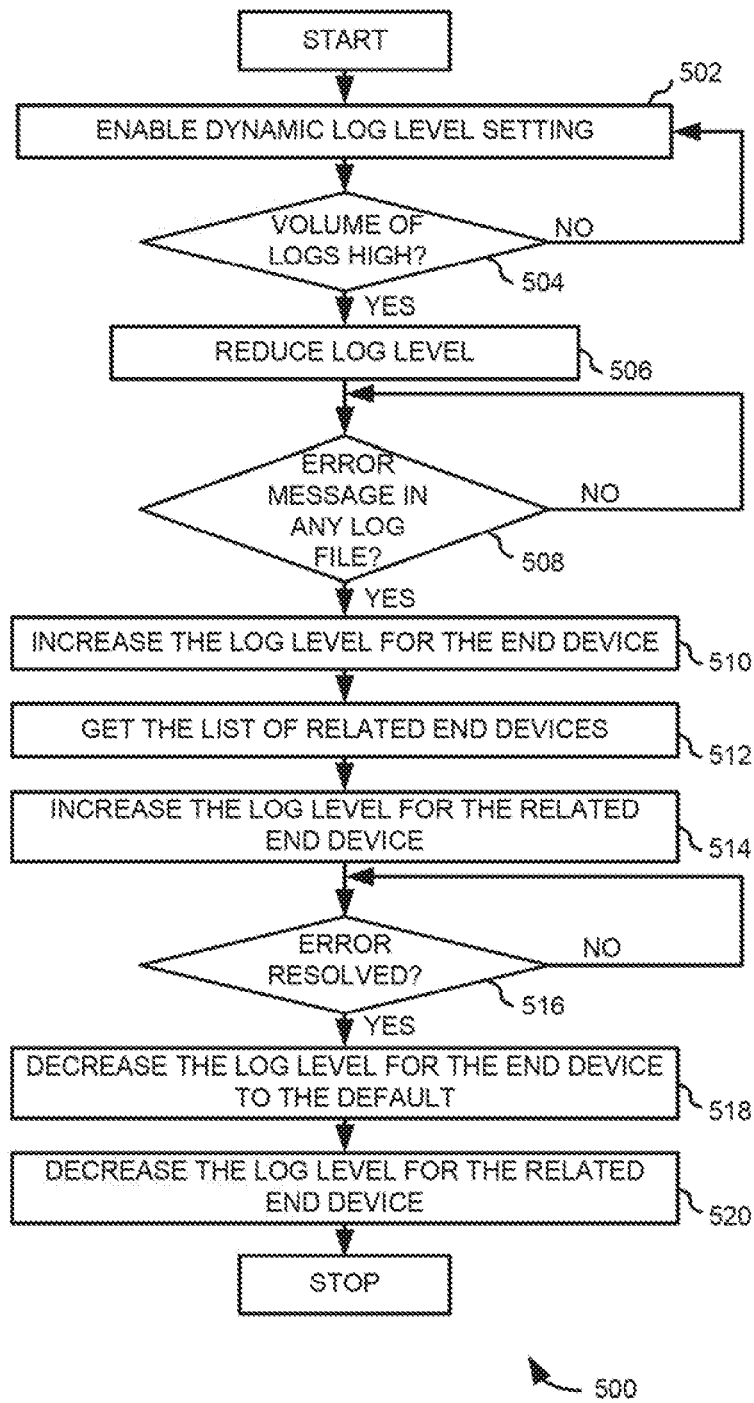
FIG. 5 is another flow diagram illustrating a method for dynamic log level control, according to the present disclosure.
Figure 6:
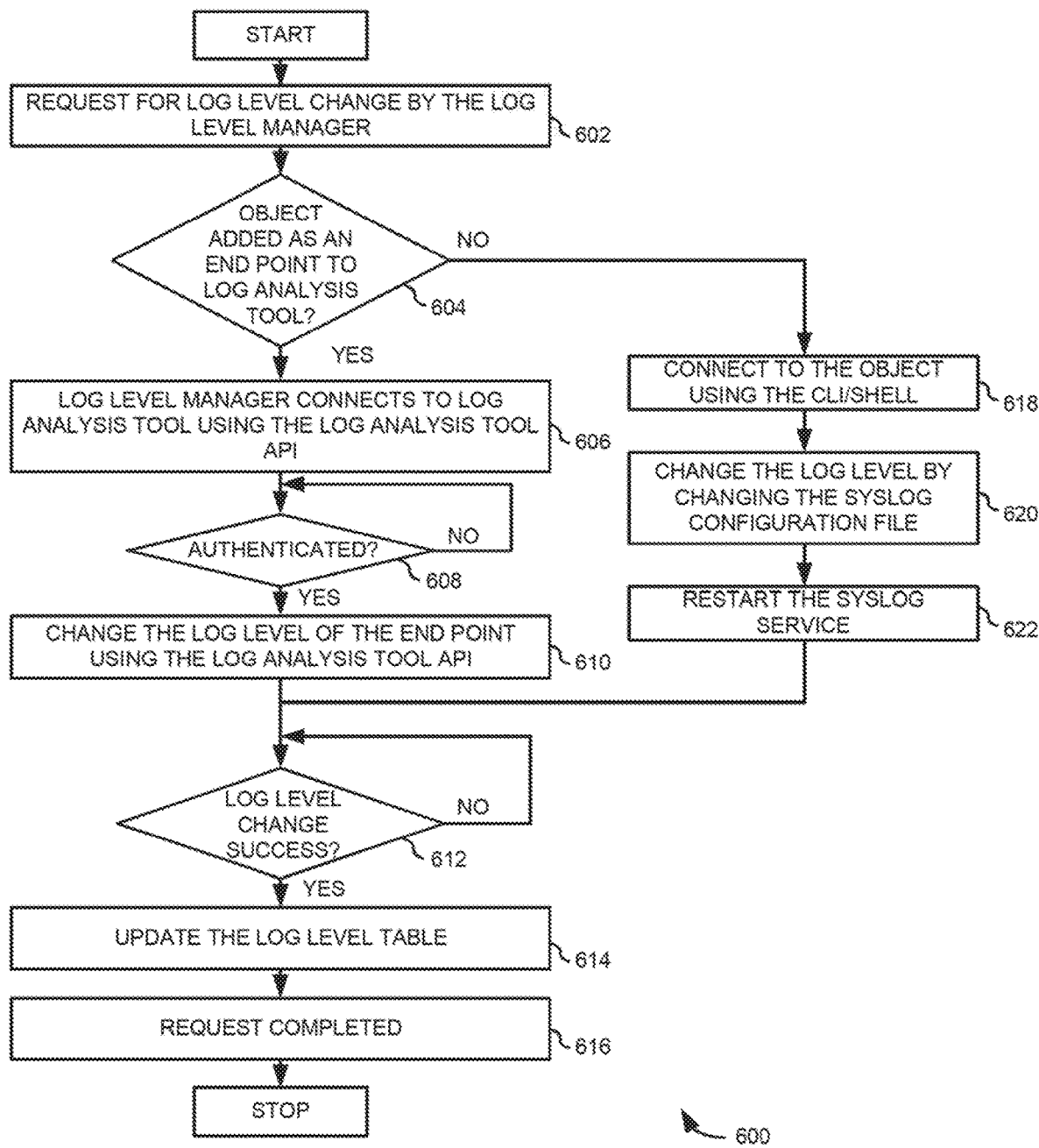
FIG. 6 is yet another flow diagram illustrating a method for dynamic log level control, according to the present disclosure.

For the purpose of simplicity of explanation, the example methods of FIGS. 4, 5, and 6 are shown as executing serially, however it is to be understood and appreciated that the present and other examples are not limited by the illustrated order. The example systems of FIGS. 1, 2, and 3, and method of FIGS. 4, and 6 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to early or store desired program code in the form of computer-executable instructions and which can be accessed by a general purpose or special purpose computer. The computer readable instructions can also be accessed from memory and executed by a processor.

In some embodiments, a method may be performed by a processing resource executing instructions. The method may include obtaining training data for a software defined data center, wherein the training data comprises a plurality of training metrics associated with an application and respective response time data associated with the application, extracting a set of relevant metrics from the training data, determining a relationship between the relevant metrics and the respective response time data associated with the application, and predicting future performance of the application based on the relationship between the relevant features of the training data and the respective response time data associated with the application.

Although specific embodiments have been described above, these embodiments are not intended to limit the scope of the present disclosure, even where only a single embodiment is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to:
   receive a stream of log data from a plurality of end devices in a virtualized computing infrastructure via associated logging interfaces;
   dynamically analyze the received stream of log data;
   determine an error message associated with a first end device;
   in response to determining the error message associated with the first end device, increase the log level associated with the first end device and identify related end devices to the first end device based on a service dependency of the plurality of end devices;
   in response to identifying the related end devices, increase the log level associated with the plurality of related end devices, wherein increasing the log level comprises editing a log configuration file;
   determine that an error is resolved with the first end device;
   in response to determining that the error resolved with the first end device, decrease the log level associated with the first end device to a default value and decrease the log level associated with the plurality of related end devices; and
   receive the log data associated with the controlled log level of the first end device and the plurality of related end devices for debugging and troubleshooting.

2. The non-transitory machine-readable medium of claim 1, wherein each logging interface is an application programming interface (API) or a SYSLOG service.

3. The non-transitory machine-readable medium of claim 1, wherein the end devices comprise at least one of a storage device, computing device, virtual machine, container, network device, operating system, and software application.

4. The non-transitory machine-readable medium of claim 1, wherein dynamically analyzing the received stream of log data comprises:
   dynamically analyze at least one of a quality, quantity and severity of the received stream of log data from any one or more of the plurality of end devices.

5. The non-transitory machine-readable medium of claim 4, wherein dynamically analyzing the severity of the received stream of log data, comprises:
   determining whether there are any error messages associated with the one or more of the plurality of end devices in the received stream of log data.

6. The non-transitory machine-readable medium of claim 5, wherein controlling the log level of any one or more of the plurality of end devices comprises:

changing the log level of the received stream of log data associated with the one or more of the plurality of end devices based on the outcome of the determined error messages.

7. The non-transitory machine-readable medium of claim 6, wherein changing the log level of the received stream of log data comprises either increasing or decreasing the log level of the received stream of log data associated with the one or more of the plurality of end devices based on the outcome of the determined error messages and selecting one of predetermined log levels.

8. A method of dynamically controlling log level, the method comprising:
   receiving a stream of log data from a plurality of end devices in a virtualized computing infrastructure via associated logging interfaces in the datacenter;
   dynamically analyzing the received stream of log data;
   determining an error message associated with a first end device;
   in response to determining the error message associated with the first end device, increasing the log level associated with the first end device and identifying related end devices to the first end device based on a service dependency of the plurality of end devices;
   in response to identifying the related end devices, increasing the log level associated with the plurality of related end devices, wherein increasing the log level comprises editing a log configuration file;
   determining that an error is resolved with the first end device;
   in response to determining that the error resolved with the first end device, decreasing the log level associated with the first end device to a default value and decreasing the log level associated with the plurality of related end devices; and
   receiving the log data associated with the controlled log level of the first end device and the plurality of related end devices for debugging and troubleshooting.

9. The method of claim 8, wherein each logging interface is an application programming interface (API) or a SYSLOG service.

10. The method of claim 8, wherein the end devices comprise at least one of a storage device, computing device, virtual machine, container, operating system, network device, and software application.

11. The method of claim 8, wherein dynamically analyzing the received stream of log data comprises:
   dynamically analyzing at least one of quality, quantity and severity of the received stream of log data from any one or more end devices.

12. The method of claim 11, wherein dynamically analyzing the severity of the received stream of log data, comprises:
   determining whether there are any error messages associated with the one or more of the plurality of end devices in the received stream of log data.

13. The method of claim 11, wherein controlling the log level of any one or more of the plurality of end devices comprises:
   changing the log level of the received stream of log data associated with the one or more of the plurality of end devices based on the outcome of the determined error messages.

14. The method of claim 11, wherein changing the log level of the received stream of log data comprises either increasing or decreasing the log level of the received stream of log data associated with the one or more of the plurality end devices based on the outcome of the determined error messages and selecting one of the predetermined log levels.

15. A system, comprising:
   a processor; and
   a computer storage medium comprising instructions for controlling the processor to be operable to:
      receive a stream of log data from a plurality of end devices in a virtualized computing infrastructure via associated logging interfaces in a datacenter;
      dynamically analyze the received stream of log data;
      determine an error message associated with a first end device;
      in response to determining the error message associated with the first end device, increase the log level associated with the first end device and identify related end devices to the first end device based on a service dependency of the plurality of end devices;
      in response to identifying the related end devices, increase the log level associated with the plurality of related end devices, wherein increasing the log level comprises editing a log configuration file;
      determine that an error is resolved with the first end device;
      in response to determining that the error resolved with the first end device, decrease the log level associated with the first end device to a default value and decrease the log level associated with the plurality of related end devices; and
      receive the log data associated with the controlled log level of the first end device and the plurality of related end devices.

16. The system of claim 15, wherein each logging interface is an application programming interface (API) or a SYSLOG service.

17. The system of claim 16, wherein the end devices comprise at least one of a storage device, computing device, virtual machine, container, operating system, network device, and software application.

18. The system of claim 16, wherein the processor is configured to:
   dynamically analyze at least one of quality, quantity and severity of the received stream of log data from any one or more of the plurality of end devices.

19. The system of claim 18, wherein the processor is configured to:
   determine whether there are any error messages associated with the one or more of the plurality of end devices in the received stream of log data.

20. The system of claim 18, wherein the processor is configured to:
   change the log level of the received stream of log data associated with the one or more of the plurality of end devices based on the outcome of the determined error messages.

21. The system of claim 18, wherein the processor is configured to:
   change the log level of the received stream of log data comprises either increasing or decreasing the log level of the received stream of log data associated with the one or more of the plurality of end devices based on the outcome of the determined error messages and selecting one of the predetermined log levels.

* * * * *